(12) United States Patent
Sun et al.

(10) Patent No.: US 11,363,502 B2
(45) Date of Patent: Jun. 14, 2022

(54) VOICE CALL PROCESSING METHOD AND TERMINAL DEVICE

(71) Applicant: Huawei Technologies Co., Ltd., Shenzhen (CN)

(72) Inventors: Bing Sun, Beijing (CN); Hong Li, Beijing (CN); Lin Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/086,878

(22) Filed: Nov. 2, 2020

(65) Prior Publication Data

US 2021/0120460 A1  Apr. 22, 2021

Related U.S. Application Data

(63) Continuation of application No. 16/051,997, filed on Aug. 1, 2018, now Pat. No. 10,827,393, which is a (Continued)

(51) Int. Cl.
*H04W 48/18* (2009.01)
*H04W 36/00* (2009.01)
*H04M 7/12* (2006.01)
*H04W 8/08* (2009.01)
*H04W 36/14* (2009.01)
*H04W 36/16* (2009.01)
*H04W 36/26* (2009.01)
*H04W 36/38* (2009.01)

(52) U.S. Cl.
CPC ..... *H04W 36/0022* (2013.01); *H04M 7/1235* (2013.01); *H04W 8/08* (2013.01); *H04W 36/14* (2013.01); *H04W 36/165* (2013.01); *H04W 36/26* (2013.01); *H04W 36/38* (2013.01); *H04W 48/18* (2013.01)

(58) Field of Classification Search
None
See application file for complete search history.

(56) References Cited

U.S. PATENT DOCUMENTS

2010/0113010 A1  5/2010 Edward et al.
2010/0265914 A1  10/2010 Osok et al.
(Continued)

FOREIGN PATENT DOCUMENTS

CN  101854686 A  10/2010
CN  102405671 A  4/2012
(Continued)

OTHER PUBLICATIONS

Poikselk, M., et al., "VoLTE End to End and Signaling," In: Voice Over LTE, Feb. 1, 2012, John Wiley and Sons, Ltd., Chichester, UK, XP055082307, pp. 99-215.
(Continued)

*Primary Examiner* — Kodzovi Acolatse
(74) *Attorney, Agent, or Firm* — Conley Rose, P.C.

(57) ABSTRACT

The A voice call processing method includes, when a terminal meets at least one of two preset conditions, performing handover from a Long Term Evolution (LTE) network currently accessed by the terminal to a non-LTE standard network, and performing a circuit switched (CS) voice call process on the non-LTE standard network.

20 Claims, 8 Drawing Sheets

Related U.S. Application Data continuation of application No. PCT/CN2016/073047, filed on Feb. 1, 2016.

(56) References Cited

U.S. PATENT DOCUMENTS

| | | |
|---|---|---|
| 2010/0297979 A1 | 11/2010 | Watfa et al. |
| 2011/0028120 A1 | 2/2011 | Wu |
| 2011/0122862 A1 | 5/2011 | Yun et al. |
| 2011/0171926 A1 | 7/2011 | Faccin et al. |
| 2012/0064884 A1 | 3/2012 | Ramachandran et al. |
| 2012/0087340 A1* | 4/2012 | Yang ............... H04W 36/0022 370/331 |
| 2013/0100795 A1 | 4/2013 | Zhao et al. |
| 2015/0078337 A1 | 3/2015 | Kim |
| 2015/0172962 A1 | 6/2015 | Watfa et al. |
| 2016/0105790 A1 | 4/2016 | Shu |
| 2016/0183156 A1* | 6/2016 | Chin ............... H04L 61/2007 370/331 |
| 2016/0278132 A1 | 9/2016 | Baek et al. |
| 2016/0337908 A1 | 11/2016 | Poikselka et al. |
| 2018/0124764 A1 | 5/2018 | Lee |

FOREIGN PATENT DOCUMENTS

| | | |
|---|---|---|
| CN | 102457926 A | 5/2012 |
| EP | 2277342 B1 | 1/2012 |
| WO | 2013066060 A1 | 5/2013 |
| WO | 2014201630 A1 | 12/2014 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 13)," 3GPP Standard; 3GPP TS 24.301, V13.1.0, XP050927892, Mar. 20, 2015, 384 pages.

3GPP TS 24.008, V13.4.0, "3rd Generation Partnership Project; Technical Specification Group Core Network and Terminals; Mobile radio interface Layer 3 specification; Core network protocols; Stage 3 (Release 13)," Dec. 2015, 733 pages.

* cited by examiner

VOICE CALL PROCESSING METHOD AND TERMINAL DEVICE

CROSS-REFERENCE TO RELATED APPLICATIONS

This application is a continuation of U.S. patent application Ser. No. 16/051,997, filed on Aug. 1, 2018, which is a continuation of International Patent Application No. PCT/CN2016/073047, filed on Feb. 1, 2016. All of the aforementioned patent applications are hereby incorporated by reference in their entireties.

TECHNICAL FIELD

The present disclosure relates to communications technologies, and in particular, to a voice call processing method and a terminal device.

BACKGROUND

With the popularization of smartphones, competition between smartphone manufacturers is increasingly fierce, and competition in hardware configuration is gradually upgraded to competition in user experience. A voice call completion rate is a key indicator of user experience. Therefore, it is particularly important to increase a voice call completion rate of a smartphone.

A mainstream voice solution used in Long Term Evolution (LTE) is a Voice over LTE (VoLTE) technology. A main idea of the method is to use an Internet Protocol (IP) bearer channel that is provided by an LTE wireless network and an evolved packet core (EPC) network, to access an IP multimedia subsystem (IMS) core network. An IMS-related service platform provides voice service call processing.

However, according to the VoLTE method, when a terminal is in a limited service state on an LTE network, and the LTE network receives a voice call request from another user and sends the request to the terminal, only an emergency service is provided in VoLTE because the terminal is in the limited service state of the LTE network, and the terminal in a VoLTE state ignores the voice call request. Consequently, the another user cannot successfully call the terminal, thereby reducing a voice call completion rate of a smartphone and causing poor user experience.

SUMMARY

The present disclosure provides a voice call processing method and a terminal device, so as to resolve a problem of a low call completion rate that is caused when a VoLTE method is used to perform a voice call and a terminal is in a limited service state on an LTE network.

According to a first aspect, the present disclosure provides a voice call processing method, including, when a terminal meets at least one of two preset conditions, performing handover from a LTE network currently accessed by the terminal to a non-LTE standard network, where the two preset conditions include condition 1: receiving a voice paging request sent by the LTE network in a limited service state of the LTE network, where the voice paging request is used to call the terminal to perform a voice call, and only an emergency call service is supported in the limited service state of the LTE network, and condition 2: sending an extended service request to the LTE network and receiving a reject message corresponding to the extended service request, where the extended service request is used to request the LTE network to redirect or hand over the terminal to a network of a communications standard other than the LTE network, and performing a circuit switched (CS) voice call process on the non-LTE standard network.

According to the voice call processing method provided in the first aspect, when the terminal meets at least one of the two preset conditions, the terminal performs handover from the LTE network currently accessed by the terminal to the non-LTE standard network and performs the CS voice call process on the non-LTE standard network, to implement the voice call. Therefore, the voice call processing method provided in an embodiment of the present disclosure increases a voice call completion rate of the terminal and meets a user experience requirement.

In a first possible implementation of the first aspect, when condition 1 is met, the performing handover from an LTE network currently accessed by the terminal to a non-LTE standard network includes, in response to the voice paging request, proactively choosing, by the terminal, to hand over to the currently accessible non-LTE standard network, and the method further includes returning, by the terminal, a voice paging response to the non-LTE standard network.

According to the method provided in the first possible implementation, in response to the voice paging request, the terminal proactively chooses to hand over to the currently accessible non-LTE standard network, and returns the voice paging response to the non-LTE standard network such that the terminal can rapidly access the non-LTE standard network.

In a second possible implementation of the first aspect, when condition 1 is met, the performing handover from an LTE network currently accessed by the terminal to a non-LTE standard network includes, in response to the voice paging request, sending, by the terminal, the extended service request to the LTE network, and redirecting or handing over, according to an instruction of the LTE network, the terminal from the LTE network to the accessible non-LTE standard network, and the method further includes returning, by the terminal, a voice paging response to the non-LTE standard network.

According to the method provided in the second possible implementation, in response to the voice paging request, the terminal sends the extended service request to the LTE network, redirects or hands over, under the instruction of the LTE network, the terminal from the LTE network to the accessible non-LTE standard network, and returns the voice paging response to the non-LTE standard network such that the terminal can accurately access the available non-LTE standard network.

In a third possible implementation of the first aspect, when condition 1 is met, the terminal in the limited service state on an LTE network is on an LTE network cell providing a limited service and establishes an emergency call bearer only with the LTE network.

According to the method provided in the third possible implementation, when condition 1 is met, the terminal in the limited service state of the LTE network camps on the an LTE network cell providing a limited service and establishes the emergency call bearer only with the LTE network, to ensure call quality of an emergency call of the LTE network.

In a fourth possible implementation of the first aspect, when condition 1 is met, the performing a CS voice call process on the non-LTE standard network includes, in response to the voice paging request, performing a CS voice call reply process on the non-LTE standard network.

According to the method provided in the fourth possible implementation, when condition 1 is met, in response to the voice paging request, the terminal performs the CS voice call reply process on the non-LTE standard network, to implement the voice call of the terminal.

In a fifth possible implementation of the first aspect, when condition 2 is met, the reject message includes a reject cause indicator value indicating that a CS domain is unavailable.

According to the method provided in the fifth possible implementation, when condition 2 is met, the reject message includes the reject cause indicator value indicating that the CS domain is unavailable. In this case, the terminal can perform corresponding processing according to the reject cause value in the reject message.

In a sixth possible implementation of the first aspect, when condition 2 is met, the performing a CS voice call process on the non-LTE standard network includes proactively initiating the CS voice call process on the non-LTE standard network.

According to the method provided in the sixth possible implementation, when condition 2 is met, the terminal proactively initiates the CS voice call process on the non-LTE standard network, to implement the voice call of the terminal.

Optionally, the non-LTE standard network includes a second generation wireless technology (2G) network or a third generation wireless technology (3G) network.

According to a second aspect, the present disclosure provides a terminal device, including a determining module, configured to when at least one of two preset conditions is met, perform handover from a LTE network currently accessed by the terminal device to a non-LTE standard network, where the two preset conditions include condition 1: receiving a voice paging request sent by the LTE network in a limited service state of the LTE network, where the voice paging request is used to call the terminal device to perform a voice call, and only an emergency call service is supported in the limited service state of the LTE network, and condition 2: sending an extended service request to the LTE network and receiving a reject message corresponding to the extended service request, where the extended service request is used to request the LTE network to redirect or hand over the terminal device to a network of a communications standard other than the LTE network, and a voice call module, configured to perform a CS voice call process on the non-LTE standard network.

In a first possible implementation of the second aspect, the determining module is configured to, when condition 1 is met, in response to the voice paging request, proactively choose to hand over to the currently accessible non-LTE standard network, and return a voice paging response to the non-LTE standard network.

In a second possible implementation of the second aspect, the determining module is configured to, when condition 1 is met, in response to the voice paging request, send the extended service request to the LTE network, and redirect or hand over, according to an instruction of the LTE network, from the LTE network to the accessible non-LTE standard network, and return a voice paging response to the non-LTE standard network.

In a third possible implementation of the second aspect, when condition 1 is met, the terminal device in the limited service state of the LTE network camps om an LTE network cell providing a limited service and establishes an emergency call bearer only with the LTE network.

In a fourth possible implementation of the second aspect, the voice call module is configured to, when condition 1 is met, in response to the voice paging request, perform a CS voice call reply process on the non-LTE standard network.

In a fifth possible implementation of the second aspect, when condition 2 is met, the reject message includes a reject cause indicator value indicating that a CS domain is unavailable.

In a sixth possible implementation of the second aspect, the voice call module is configured to, when condition 2 is met, proactively initiate the CS voice call process on the non-LTE standard network.

Optionally, the non-LTE standard network includes a 2G network or a 3G network.

For beneficial effects brought by the second aspect and the possible implementations of the second aspect, correspondingly refer to the beneficial effects brought by the first aspect and the possible implementations of the first aspect. Details are not described herein again.

According to a third aspect, the present disclosure provides a terminal device, including a processor, and a memory configured to store an instruction that is executed by the processor, where the processor and the memory are coupled with each other using a system bus, and the processor is configured to read the instruction from the memory.

Optionally, the processor is a communications baseband processor.

The processor is configured to perform the following operations when performing the instruction, when at least one of two preset conditions is met, performing handover from a LTE network currently accessed by the terminal device to a non-LTE standard network, where the two preset conditions include condition 1: receiving a voice paging request sent by the LTE network in a limited service state of the LTE network, where the voice paging request is used to call the terminal to perform a voice call, and only an emergency call service is supported in the limited service state of the LTE network, and condition 2: sending an extended service request to the LTE network and receiving a reject message corresponding to the extended service request, where the extended service request is used to request the LTE network to redirect or hand over the terminal to a network of a communications standard other than the LTE network, and performing a CS voice call process on the non-LTE standard network.

For beneficial effects brought by the implementation of the third aspect, correspondingly refer to the beneficial effects brought by the implementations of the first aspect. Details are not described herein again.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
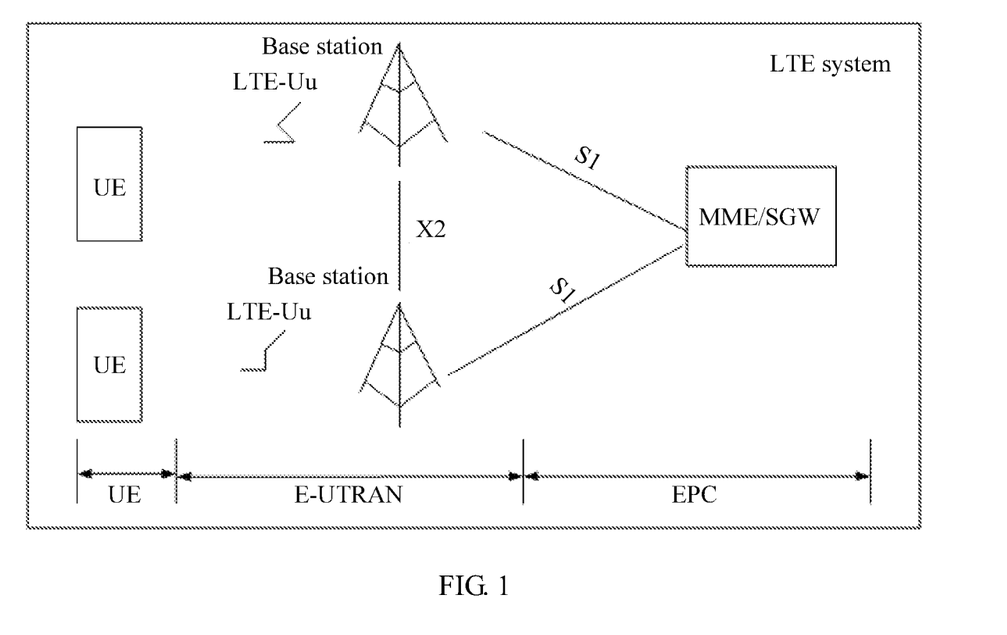
FIG. 1 is a schematic architecture diagram of an LTE system according to an embodiment of the present disclosure.

A voice call processing method and a terminal device in the embodiments of the present disclosure may be applicable to a network architecture of an LTE system, or may be applicable to a network architecture of a next generation (4.5$^{th}$ generation wireless technology (4.5G) network or a fifth generation wireless technology (5G) network) communications system. FIG. 1 is a schematic architecture diagram of an LTE system according to an embodiment of the present disclosure. As shown in FIG. 1, the LTE system is used as an example, and the LTE system includes user equipment, an evolved Node B (eNodeB), and an EPC. The EPC is responsible for a core network part, a mobility management entity (MME) is responsible for a signaling processing part, a serving gateway (S-GW) is responsible for a data processing part, and the eNodeB is responsible for an access network part. The access network part is also referred to as an evolved universal mobile telecommunications system (UMTS) terrestrial radio access network (Evolved UTRAN). The LTE system supports an interoperation with another 3GPP system, and the LTE system is divided into a frequency division duplexing-LTE (FDD-LTE) system and a time division duplexing-LTE (TDD-LTE) system according to different duplex modes. A terminal in this embodiment of the present disclosure may be a smartphone or may be a wearable device.

A mobile switching center (MSC) in this embodiment of the present disclosure is a place that provides a call transfer service and call control between a telephone and a data system.

The voice call processing method and terminal device provided in the embodiments of the present disclosure are intended to resolve a problem of a low call completion rate that is caused when a VoLTE method is used to perform a voice call and a terminal is in a limited service state on an LTE network.

The following describes the technical solutions of the present disclosure in detail using specific embodiments. The following several specific embodiments may be combined with each other, and same or similar concepts or processes may not be repeated in some embodiments.

Figure 2:
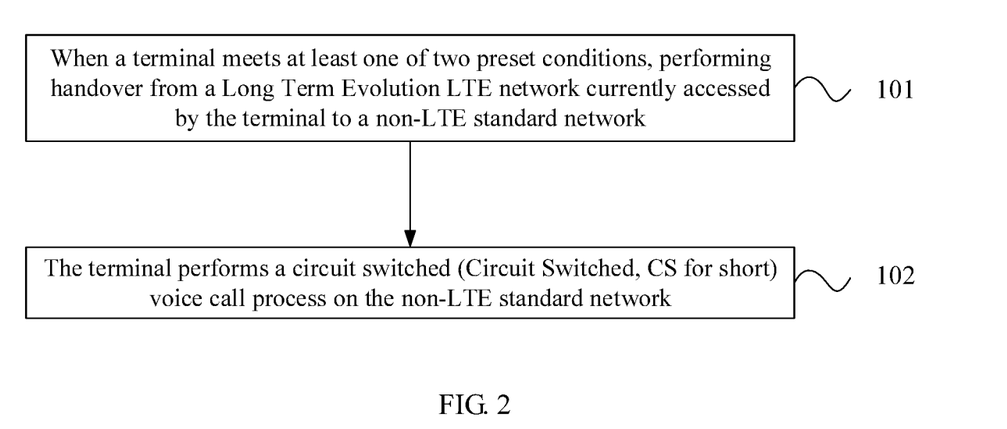
FIG. 2 is a flowchart of Embodiment 1 of a voice call processing method according to the embodiments of the present disclosure.

FIG. 2 is a flowchart of Embodiment 1 of a voice call processing method according to the embodiments of the present disclosure. As shown in FIG. 2, the method includes the following steps.

Step 101. When a terminal meets at least one of two preset conditions, performing handover from a LTE network currently accessed by the terminal to a non-LTE standard network.

In this embodiment, the non-LTE standard network may be a 2G network, or a 3G network, but no limitation is set thereto.

The two preset conditions include condition 1: receiving a voice paging request sent by the LTE network in a limited service state of the LTE network, where the voice paging request is used to call the terminal to perform a voice call, and only an emergency call service is supported in the limited service state of the LTE network, and condition 2: sending an extended service request to the LTE network and receiving a reject message corresponding to the extended service request, where the extended service request is used to request the LTE network to redirect or hand over the terminal to a network of a communications standard other than the LTE network.

In this embodiment, for example, when a voice service of a terminal A is in the limited service state of the LTE network and only an emergency call service is supported, the LTE network on which the terminal A currently resides receives a request of a terminal B for voice paging to the terminal A. In this case, the terminal A meets condition 1. When the terminal A needs to call the terminal B, the terminal A sends an extended service request to the LTE network on which the terminal A currently resides and receives a reject message corresponding to the extended service request. In this case, the terminal A meets condition 2.

Step 102. The terminal performs a CS voice call process on the non-LTE standard network.

In this embodiment, the CS voice call process is performed on the non-LTE standard network, so as to perform the voice call.

In this embodiment, when the terminal meets the at least one of the two preset conditions, the terminal performs handover from the LTE network currently accessed by the terminal to the non-LTE standard network and performs the CS voice call process on the non-LTE standard network. Condition 1 is receiving a voice paging request sent by the LTE network in a limited service state of the LTE network, where the voice paging request is used to call the terminal to perform a voice call, and only an emergency call service is supported in the limited service state of the LTE network. Condition 2 is sending an extended service request to the LTE network and receiving a reject message corresponding to the extended service request, where the extended service request is used to request the LTE network to redirect or hand over the terminal to a network of a communications standard other than the LTE network. In this case, when the terminal meets the at least one of the two conditions, a normal voice call is performed, avoiding a problem that a terminal cannot perform a voice call when the terminal meets any preset condition, thereby improving a voice call completion rate of the terminal and meeting a user experience requirement.

Figure 3:
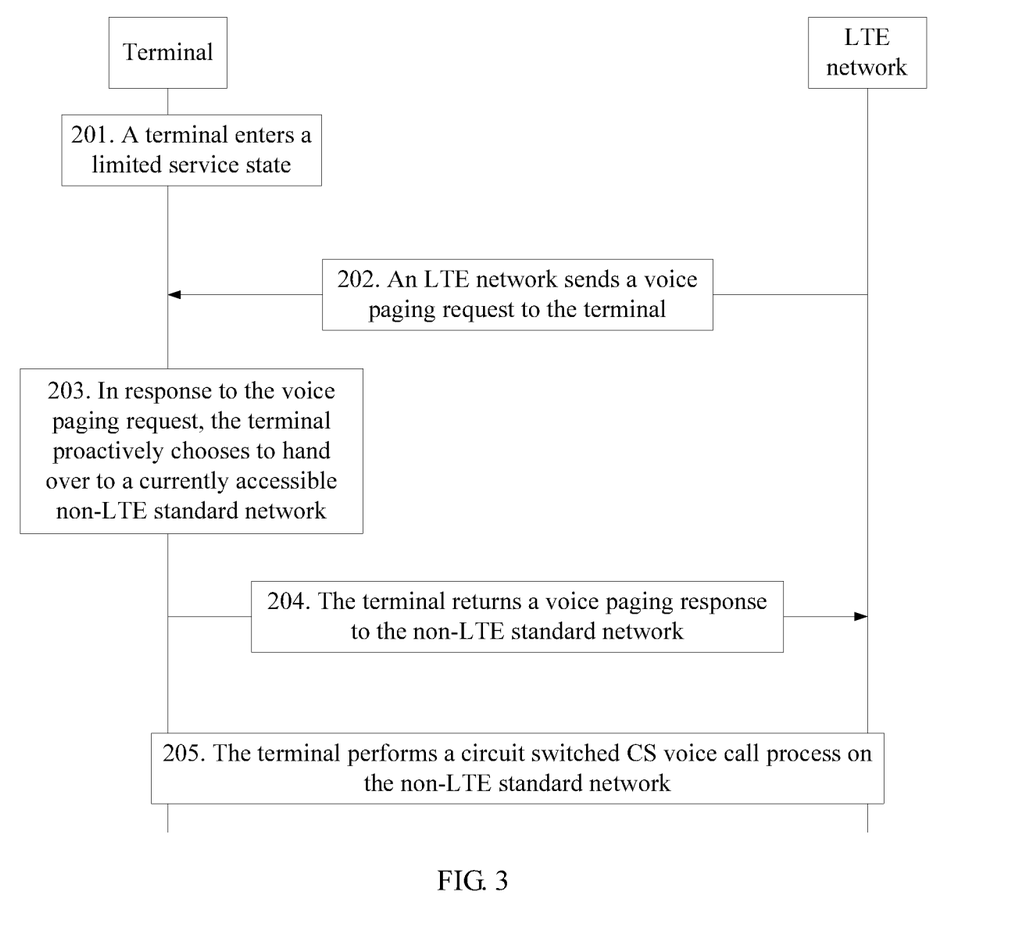
FIG. 3 is a signaling diagram of Embodiment 2 of a voice call processing method according to the embodiments of the present disclosure.

FIG. 3 is a signaling diagram of Embodiment 2 of a voice call processing method according to the embodiments of the present disclosure. As shown in FIG. 3, the method includes the following steps.

Step 201. A terminal is in a limited service state on an LTE network.

In this embodiment, the terminal receives a voice paging request sent by the LTE network in the limited service state of the LTE network, where the voice paging request is used to call the terminal to perform a voice call, and only an emergency call service is supported in the limited service state of the LTE network.

In addition, it should be noted that, the terminal in the limited service state of the LTE network is in an LTE network cell providing a limited service and establishes an emergency call bearer only with the LTE network.

Step 202. The LTE network sends a voice paging request to the terminal.

Step 203. In response to the voice paging request, the terminal proactively chooses to hand over to a currently accessible non-LTE standard network.

Step 204. The terminal returns a voice paging response to the non-LTE standard network.

Step 205. The terminal performs a CS voice call process on the non-LTE standard network.

In this embodiment, in response to the voice paging request, the terminal performs a CS voice call reply process on the non-LTE standard network.

In this embodiment, in response to the voice paging request, the terminal proactively chooses to hand over to the currently accessible non-LTE standard network, and returns the voice paging response to the non-LTE standard network such that the terminal can rapidly access the non-LTE standard network.

Figure 4:
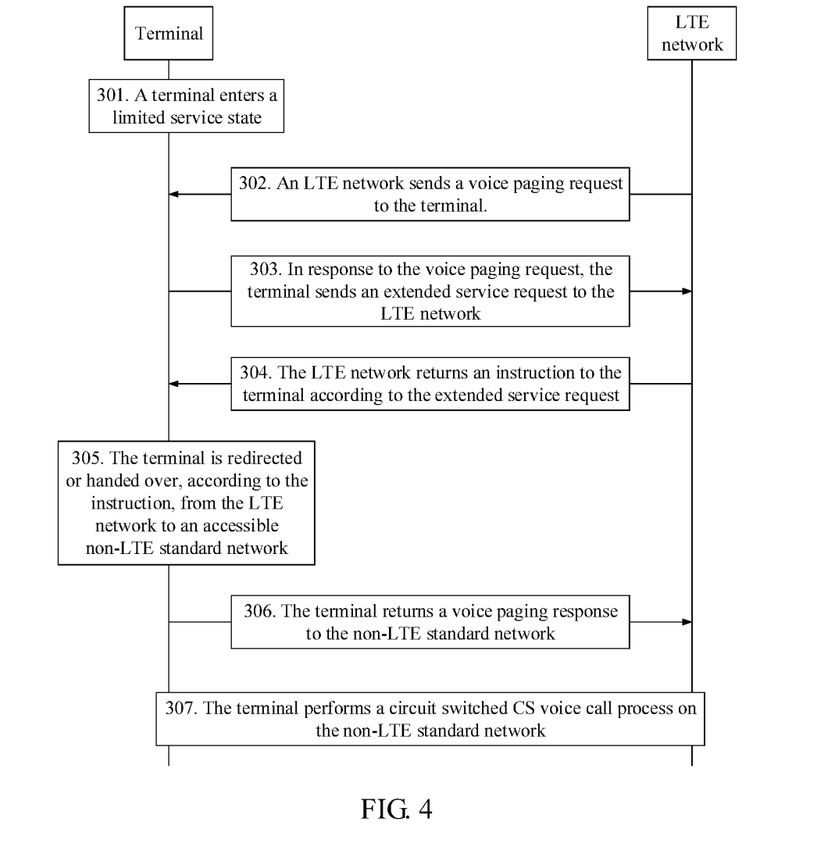
FIG. 4 is a signaling diagram of Embodiment 3 of a voice call processing method according to the embodiments of the present disclosure.

FIG. 4 is a signaling diagram of Embodiment 3 of a voice call processing method according to the embodiments of the present disclosure. As shown in FIG. 4, the method includes the following steps.

Step 301. A terminal is in a limited service state on an LTE network.

Step 302. The LTE network sends a voice paging request to the terminal.

Step 303. In response to the voice paging request, the terminal sends an extended service request to the LTE network.

Step 304. The LTE network returns an instruction to the terminal according to the extended service request.

Step 305. The terminal is redirected or handed over, according to the instruction, from the LTE network to an accessible non-LTE standard network.

Step 306. The terminal returns a voice paging response to the non-LTE standard network.

Step 307. The terminal performs a CS voice call process on the non-LTE standard network.

In this embodiment, in response to the voice paging request, the terminal performs a CS voice call reply process on the non-LTE standard network.

In this embodiment, in response to the voice paging request, the terminal sends the extended service request to the LTE network, and the terminal is redirected or handed over, according to the instruction of the LTE network, from the LTE network to the accessible non-LTE standard network, and returns the voice paging response to the non-LTE standard network such that the terminal can accurately access the available non-LTE standard network.

Figure 5:
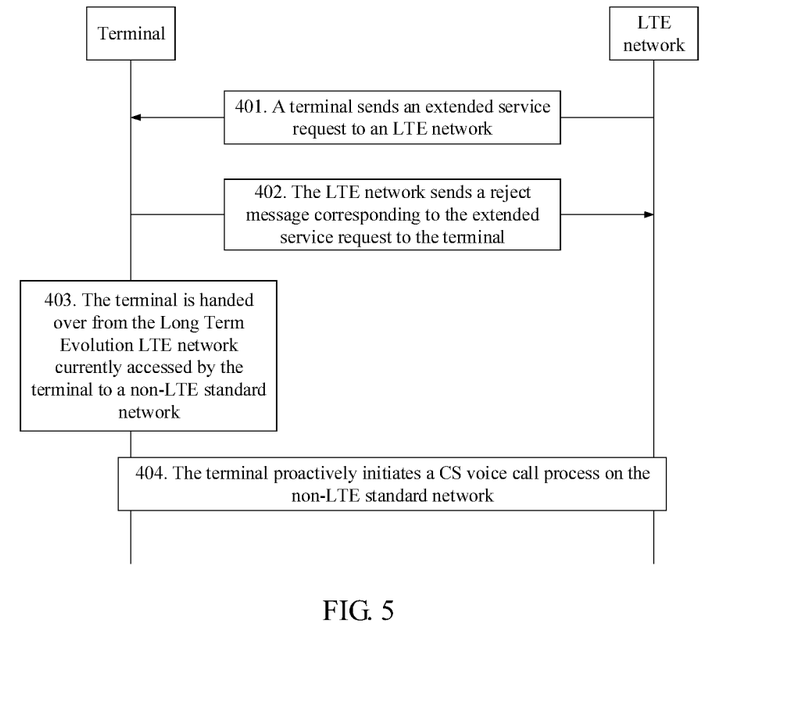
FIG. 5 is a signaling diagram of Embodiment 4 of a voice call processing method according to the embodiments of the present disclosure.

FIG. 5 is a signaling diagram of Embodiment 4 of a voice call processing method according to the embodiments of the present disclosure. As shown in FIG. 5, the method includes the following steps.

Step 401. A terminal sends an extended service request to an LTE network.

In this embodiment, the extended service request is used to request the LTE network to redirect or hand over the terminal to a network of a communications standard other than the LTE network.

Step 402. The LTE network sends a reject message corresponding to the extended service request to the terminal.

In this embodiment, the reject message includes a reject cause indicator value indicating that a CS domain is unavailable, and the cause indicator value is 18.

Step 403. The terminal is handed over from the LTE network currently accessed by the terminal to a non-LTE standard network.

Step 404. The terminal proactively initiates a CS voice call process on the non-LTE standard network.

In this embodiment, in response to the voice paging request, the terminal performs a CS voice call reply process on the non-LTE standard network.

In this embodiment, the terminal sends the extended service request to the LTE network and receives the reject message that corresponds to the extended service request and that is sent by the LTE network, and in this case, the terminal is handed over from the LTE network currently accessed by the terminal to the non-LTE standard network and proactively initiates the CS voice call process on the non-LTE standard network. In this case, a voice call of the terminal is implemented, thereby improving a voice call completion rate of the terminal and meeting a user experience requirement.

Figure 6:
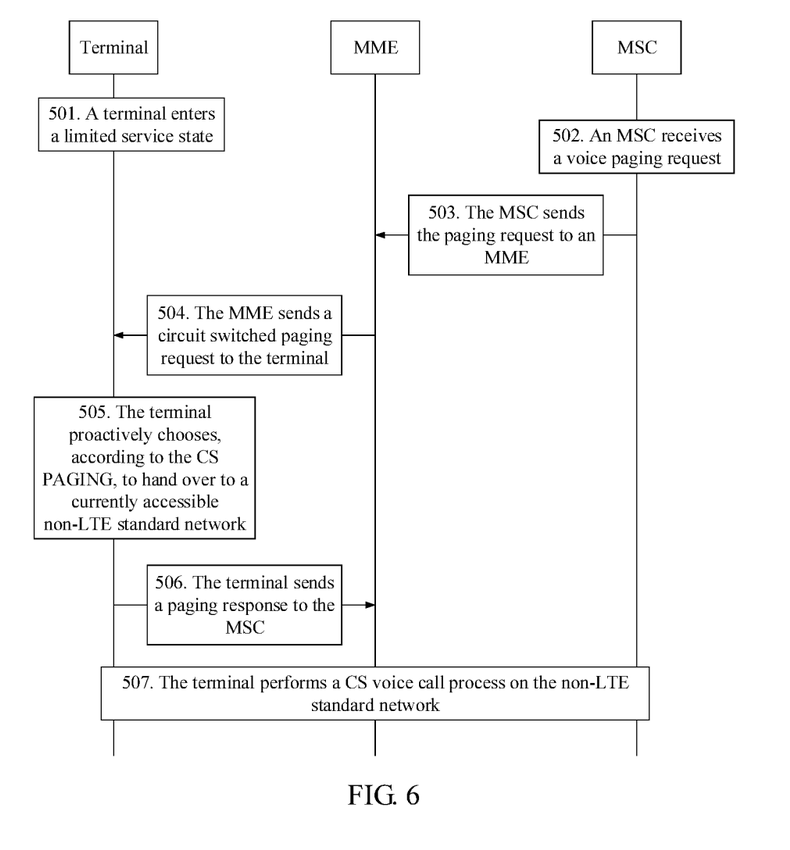
FIG. 6 is a signaling diagram of Embodiment 5 of a voice call processing method according to the embodiments of the present disclosure.

FIG. 6 is a signaling diagram of Embodiment 5 of a voice call processing method according to the embodiments of the present disclosure. As shown in FIG. 6, the method includes the following steps.

Step 501. A terminal enters a limited service state.

In this embodiment, for example, the terminal may enter the limited service state in the following manner. The terminal first sends a registration request message to an MME and an MSC and makes a VoLTE emergency call to the MME to establish an emergency bearer of the terminal, the MME sends, to the terminal, a request of releasing a common bearer, the terminal then releases the common bearer and sends a request of hanging up the VoLTE emergency call to an LTE network, the LTE network releases a link after receiving the request of hanging up the VoLTE emergency call, and the terminal enters the limited service state.

Step 502. An MSC receives a voice paging request.

In this embodiment, for example, when a voice service of a terminal A is in a limited service state of the LTE network, the MSC receives a request of a terminal B for voice paging to the terminal A.

Step 503. The MSC sends the paging request (PAGING REQ) to an MME.

In this embodiment, the PAGING REQ includes a calling number, location area information, and the like.

Step 504. The MME sends a CS paging request (CS PAGING).

Step 505. The terminal proactively chooses, according to the CS PAGING, to hand over to a currently accessible non-LTE standard network.

Step 506. The terminal sends a paging response (PAGING RSP) to the MSC.

In this embodiment, the terminal sends the paging response (PAGING RSP) to the MSC using the non-LTE standard network.

Step 507. The terminal performs a CS voice call process on the non-LTE standard network.

In this embodiment, the terminal proactively chooses, according to the voice paging request, to hand over to the currently accessible non-LTE standard network such that the terminal can rapidly access the non-LTE standard network.

Figure 7:
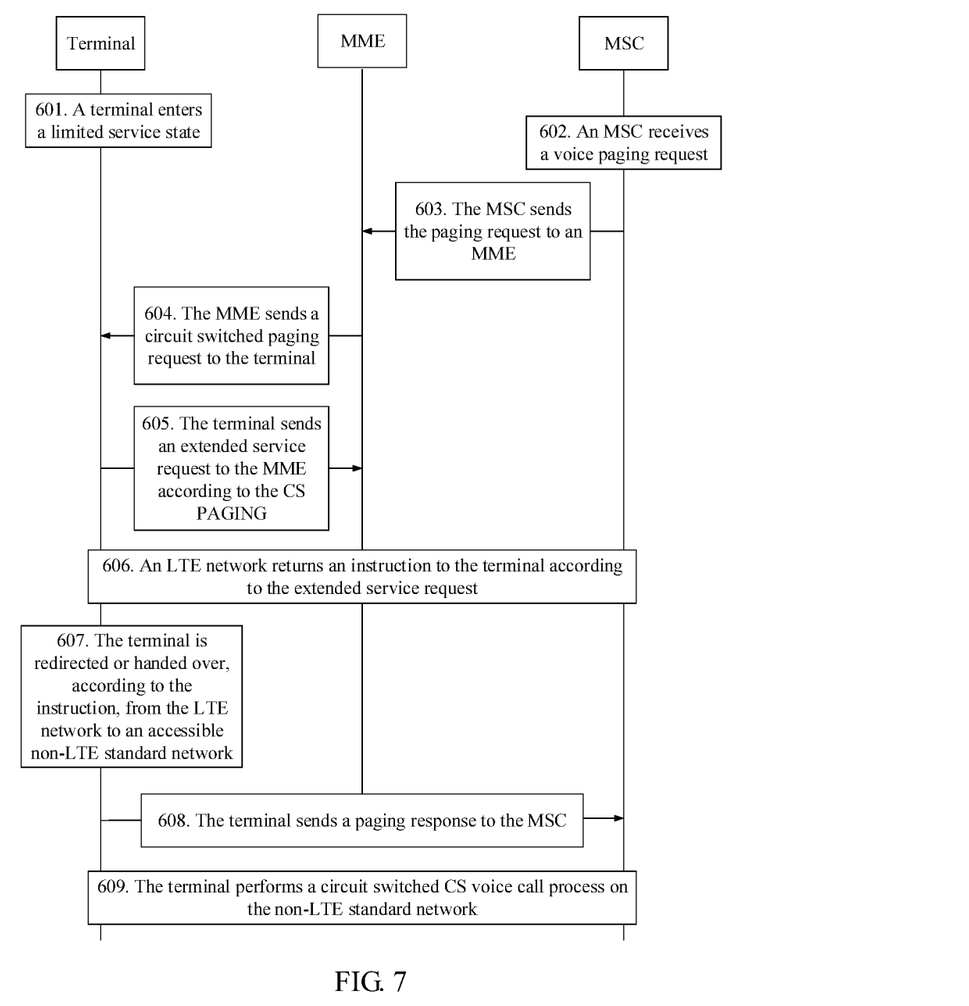
FIG. 7 is a signaling diagram of Embodiment 6 of a voice call processing method according to the embodiments of the present disclosure.

FIG. 7 is a signaling diagram of Embodiment 6 of a voice call processing method according to the embodiments of the present disclosure. As shown in FIG. 7, the method includes the following steps.

Step 601. A terminal enters a limited service state.

Step 602. An MSC receives a voice paging request.

Step 603. The MSC sends the paging request (PAGING REQ) to an MME.

Step 604. The MME sends a CS paging request (CS PAGING) to the terminal.

Step 605. The terminal sends an extended service request to the MME according to the CS PAGING Step 606. An LTE network returns an instruction to the terminal according to the extended service request.

Step 607. The terminal is redirected or handed over, according to the instruction, from the LTE network to an accessible non-LTE standard network.

In this embodiment, for example, the LTE network receives the extended service request sent by the terminal, and returns a redirection instruction to the terminal side. The terminal performs a standard redirection process according to the redirection instruction to redirect the LTE network currently accessed by the terminal to an accessible non-LTE network.

Step 608. The terminal sends a paging response (PAGING RSP) to the MSC.

Step 609. The terminal performs a CS voice call process on the non-LTE standard network.

In this embodiment, in response to the voice paging request, the terminal sends the extended service request to the LTE network, and the terminal is redirected or handed over, according to the instruction of the LTE network, from the LTE network to the accessible non-LTE standard network, and returns the voice paging response to the non-LTE standard network such that the terminal can accurately access the available non-LTE standard network.

Figure 8:
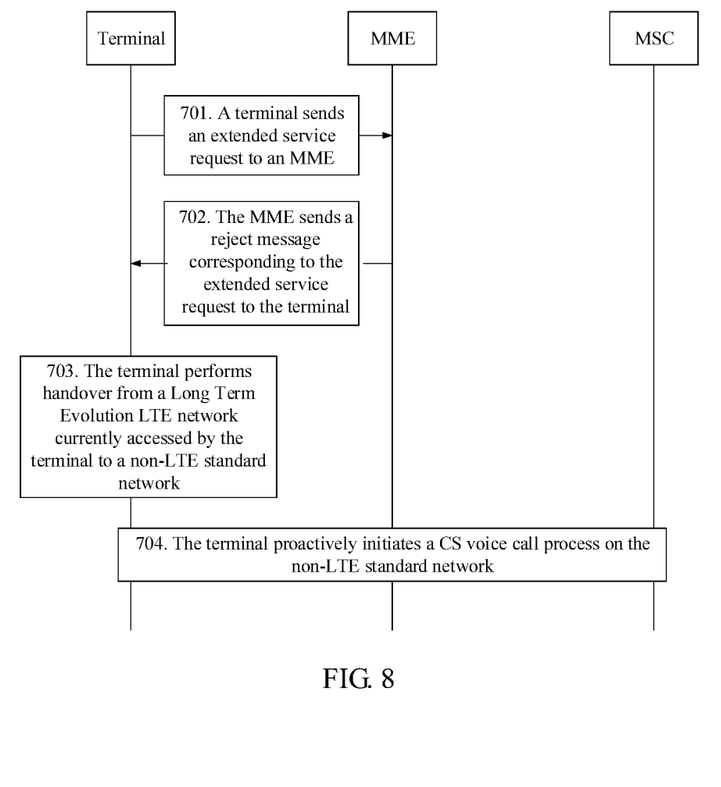
FIG. 8 is a signaling diagram of Embodiment 7 of a voice call processing method according to the embodiments of the present disclosure.

FIG. 8 is a signaling diagram of Embodiment 7 of a voice call processing method according to the embodiments of the present disclosure. As shown in FIG. 8, the method includes the following steps.

Step 701. A terminal sends an extended service request to an MME.

It should be noted that the extended service request is used to trigger an LTE network to initiate a handover (HO), a Cell Change Order (CCO), or a redirection process, to make the terminal fall back to 2G/3G.

Step 702. The MME sends a reject message corresponding to the extended service request to the terminal.

In an embodiment, the MME sends the reject message, that is, SERVICE REJ, that corresponds to the extended service request to the terminal, and returns a cause value 18 of a call failure, and the cause value 18 of the call failure indicates that a CS domain is unavailable.

Step 703. The terminal performs handover from a LTE network currently accessed by the terminal to a non-LTE standard network.

Step 704. The terminal proactively initiates a CS voice call process on the non-LTE standard network.

In this embodiment, in response to a voice paging request, the terminal performs a CS voice call reply process on the non-LTE standard network.

In this embodiment, the terminal sends the extended service request to the MME and receives the reject message that corresponds to the extended service request and that is sent by the MME to the terminal, and in this case, the terminal performs handover from the LTE network currently accessed by the terminal to the non-LTE standard network and proactively initiates the CS voice call process on the non-LTE standard network, thereby implementing a voice call of the terminal, improving a voice call completion rate of the terminal and meeting a user experience requirement.

Figure 9:
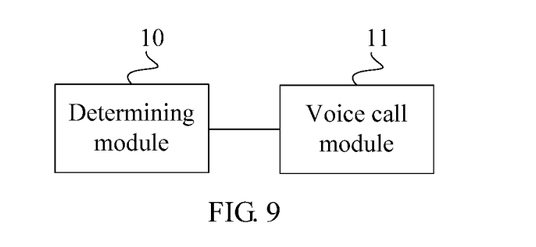
FIG. 9 is a schematic structural diagram of Embodiment 1 of a terminal device according to the embodiments of the present disclosure.

FIG. 9 is a schematic structural diagram of Embodiment 1 of a terminal device according to the embodiments of the present disclosure. As shown in FIG. 9, the terminal device includes a determining module 10 and a voice call module 11.

The determining module 10 is configured to when at least one of two preset conditions is met, perform handover from a LTE network currently accessed by the terminal device to a non-LTE standard network, where the two preset conditions include condition 1: receiving a voice paging request sent by the LTE network in a limited service state of the LTE network, where the voice paging request is used to call the terminal device to perform a voice call, and only an emergency call service is supported in the limited service state of the LTE network, and condition 2: sending an extended service request to the LTE network and receiving a reject message corresponding to the extended service request, where the extended service request is used to request the LTE network to redirect or hand over the terminal device to a network of a communications standard other than the LTE network.

The voice call module 11 is configured to perform a CS voice call process on the non-LTE standard network.

The terminal device in this embodiment can perform a technical solution of the method embodiment shown in FIG. 2, an implementation principle and a beneficial effect of the terminal device are similar to those of the method embodiment shown in FIG. 2, and details are not described herein again.

Further, based on Embodiment 1, specific implementations of the determining module 10 of the terminal device provided in the present disclosure may be the following two manners.

In one possible implementation, the determining module 10 is configured to when condition 1 is met, in response to the voice paging request, proactively choose to hand over to the currently accessible non-LTE standard network, and return a voice paging response to the non-LTE standard network.

The terminal device in this embodiment can execute the technical solution of the method embodiment shown in FIG. 3, the implementation principle and the advantageous effect are similar, and details are not described herein again.

In another possible implementation, the determining module 10 is configured to, when condition 1 is met, in response to the voice paging request, send the extended service request to the LTE network, and redirect or hand over, according to an instruction of the LTE network, from the LTE network to the accessible non-LTE standard network, and return a voice paging response to the non-LTE standard network.

It should be noted that when condition 1 is met, the terminal device in the limited service state on an LTE network is on an LTE network cell providing a limited service and establishes an emergency call bearer only with the LTE network.

In addition, an implementation of the voice call module 11 is as follows.

The voice call module 11 is configured to, when condition 1 is met, in response to the voice paging request, perform a CS voice call reply process on the non-LTE standard network.

The terminal device in this embodiment can execute the technical solution of the method embodiment shown in FIG. 4, an implementation principle and a beneficial effect of the terminal device are similar to those of the method embodiment shown in FIG. 4, and details are not described herein again.

Further, based on Embodiment 1, another implementation of the voice call module 11 of the terminal device provided in the present disclosure is as follows.

The voice call module 11 is configured to, when condition 2 is met, proactively initiate the CS voice call process on the non-LTE standard network.

It should be noted that when condition 2 is met, the reject message includes a reject cause indicator value indicating that a CS domain is unavailable.

The terminal device in this embodiment can execute the technical solution of the method embodiment shown in FIG. 5, an implementation principle and a beneficial effect of the terminal device are similar to those of the method embodiment shown in FIG. 5, and details are not described herein again.

Figure 10:
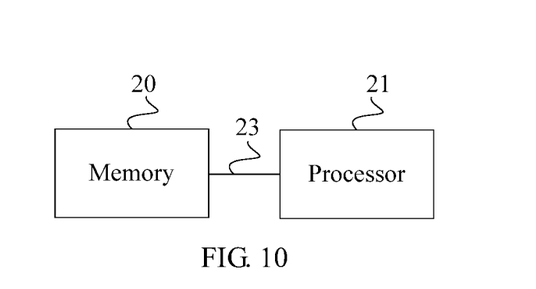
FIG. 10 is a schematic structural diagram of Embodiment 2 of a terminal device according to the embodiments of the present disclosure.

The foregoing schematically describes internal function modules and structures of the terminal device. FIG. 10 is a schematic structural diagram of Embodiment 2 of a terminal device according to the embodiments of the present disclosure. As shown in FIG. 10, the terminal device may be implemented as a processor 21, and a memory 20 configured to store an instruction that is executed by the processor 21, where the processor 21 and the memory 20 are coupled with each other using a system bus 23, and the processor 21 is configured to read the instruction from the memory 20, and optionally, the processor 21 may be a communications baseband processor.

The processor 21 is configured to perform the following operations when performing the instruction, when at least one of two preset conditions is met, hand over the terminal device from a LTE network currently accessed by the terminal device to a non-LTE standard network, where the two preset conditions include condition 1: receiving a voice paging request sent by the LTE network in a limited service state of the LTE network, where the voice paging request is used to call the terminal device to perform a voice call, and only an emergency call service is supported in the limited service state of the LTE network, and condition 2: sending an extended service request to the LTE network and receiving a reject message corresponding to the extended service request, where the extended service request is used to request the LTE network to redirect or hand over the terminal device to a network of a communications standard other than the LTE network, and performing a CS voice call process on the non-LTE standard network.

It should be noted that for specific operations performed by each unit in the embodiments of the apparatuses referred to in this embodiment, refer to the descriptions of the embodiments of the foregoing methods.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, that is, may camp on one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The foregoing integrated unit may be implemented in a form of hardware, or may be implemented in a form of a software functional unit. When the integrated unit is implemented in the form of a software functional unit and sold or used as an independent product, the integrated unit may be stored in a computer-readable storage medium. Based on such an understanding, the technical solutions of the present disclosure essentially, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

The invention claimed is:

1. A method performed by a terminal to process a voice call, the method comprising:
receiving, while the terminal is in a limited service state of a Long-Term Evolution (LTE) network, a voice paging request from the LTE network, wherein only an emergency call service is supported in the limited service state of the LTE network;

sending an extended service request to the LTE network, wherein the extended service request requests the LTE network to hand over the terminal to a non-LTE network;

receiving a reject message corresponding to the extended service request from the LTE network, wherein the reject message includes a reject cause indicator value indicating that a circuit-switched (CS) domain is unavailable;

performing a handover of the terminal from the LTE network to the non-LTE network in response to both receiving the reject message and receiving the voice paging request while the terminal is in the limited service state; and performing a CS voice call process on the non-LTE network.

2. The method of claim 1, wherein the reject cause indicator value is 18.

3. The method of claim 1, further comprising proactively initiating the CS voice call process on the non-LTE network.

4. The method of claim 1, wherein performing the CS voice call process on the non-LTE network comprises performing a CS voice call reply process on the non-LTE network.

5. The method of claim 1, wherein the non-LTE network is a second-generation (2G) network.

6. The method of claim 1, wherein the non-LTE network is a third-generation (3G) network.

7. A terminal device, comprising:
a processor; and
a memory configured to store instructions that, when executed by the processor, cause the terminal device to be configured to:
receive, while the terminal device is in a limited service state of a Long-Term Evolution (LTE) network, a voice paging request from the LTE network, wherein only an emergency call service is supported in the limited service state of the LTE network;
send an extended service request to the LTE network, wherein the extended service request requests the LTE network to hand over the terminal device to a non-LTE network;
receive a reject message corresponding to the extended service request from the LTE network, wherein the reject message includes a reject cause indicator value indicating that a circuit switched (CS) domain is unavailable;
perform a handover of the terminal device from the LTE network to the non-LTE network in response to both the reject message being received and receiving the voice paging request while the terminal device is in the limited service state; and
perform a CS voice call process on the non-LTE network.

8. The terminal device of claim 7, wherein the reject cause indicator value is 18.

9. The terminal device of claim 7, wherein the instructions further cause the terminal device to be configured to proactively initiate the CS voice call process on the non-LTE network.

10. The terminal device of claim 7, wherein the instructions further cause the terminal device to be configured to perform a CS voice call reply process on the non-LTE network.

11. The terminal device of claim 7, wherein the non-LTE network is a second-generation (2G) network.

12. The terminal device of claim 7, wherein the non-LTE network is a third-generation (3G) network.

13. The terminal device according to claim 7, wherein the processor is a communications baseband processor.

14. A non-transitory computer-readable medium comprising instructions that, when executed by a processor, cause a terminal device to:
receive, while the terminal device is in a limited service state of a Long-Term Evolution (LTE) network, a voice paging request from the LTE network, wherein only an emergency call service is supported in the limited service state of the LTE network;
send an extended service request to the LTE network, wherein the extended service request requests the LTE network to hand over the terminal device to a non-LTE network;
receive a reject message corresponding to the extended service request, wherein the reject message includes a reject cause indicator value indicating that a circuit switched (CS) domain is unavailable;
perform a handover of the terminal device from the LTE network to the non-LTE network in response to both the reject message being received and receiving the voice paging request while the terminal device is in the limited service state; and
perform a CS voice call process on the non-LTE network.

15. The non-transitory computer-readable medium of claim 14, wherein the reject cause indicator value is 18.

16. The non-transitory computer-readable medium of claim 14, wherein the instructions further cause the terminal device to proactively initiate the CS voice call process on the non-LTE network.

17. The non-transitory computer-readable medium of claim 14, wherein the instructions further cause the terminal device to perform a CS voice call reply process on the non-LTE network.

18. The non-transitory computer-readable medium of claim 14, wherein the non-LTE network is a second-generation (2G) network.

19. The non-transitory computer-readable of claim 14, wherein the non-LTE network is a third-generation (3G) network.

20. The non-transitory computer-readable medium of claim 14, wherein the processor is a communications baseband processor.

* * * * *